US012683825B2

(12) United States Patent　(10) Patent No.:　US 12,683,825 B2

Chioccola et al.　(45) Date of Patent:　Jul. 14, 2026

(54) METHOD AND SYSTEM FOR FACILITATING CROSS PLATFORM COLLABORATION IN REAL-TIME

(71) Applicant: JPMorgan Chase Bank, N.A., New York, NY (US)

(72) Inventors: Francesco Chioccola, Colchester (GB); Naina Rowan, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 42 days.

(21) Appl. No.: 18/819,424

(22) Filed: Aug. 29, 2024

(65) Prior Publication Data

US 2026/0067117 A1　Mar. 5, 2026

(51) Int. Cl.
*H04L 12/18*　(2006.01)

(52) U.S. Cl.
CPC ...... *H04L 12/1831* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 2006/0271624 A1* | 11/2006 | Lyle .................... | H04L 12/1822 709/204 |
| 2014/0098947 A1* | 4/2014 | Dingsor ............... | H04M 3/565 379/202.01 |
| 2017/0046113 A1* | 2/2017 | Noyes ................... | G06F 40/169 |
| 2017/0359551 A1* | 12/2017 | Shaw ..................... | H04N 7/152 |
| 2020/0322397 A1* | 10/2020 | Totzke ............... | H04L 65/1023 |
| 2022/0303321 A1* | 9/2022 | Ostrand ............. | H04L 65/4015 |

* cited by examiner

*Primary Examiner* — Raqiul A Choudhury

(74) *Attorney, Agent, or Firm* — Greenblum & Bernstein, P.L.C.

(57)　ABSTRACT

A method for providing workflow management to facilitate cross platform collaboration is disclosed. The method includes obtaining recipient data from various applications, the recipient data including availability data for recipients; retrieving user information from a database of a workflow management platform; initiating collaboration sessions with the applications based on the recipient data and the user information; generating, for each of the collaboration sessions, a symbolic link to specify a data access path for a recipient portfolio in corresponding recipient history data; transferring portfolio data from the applications based on the initiated collaboration sessions; and polling the applications and the workflow management platform to update the collaboration sessions.

18 Claims, 5 Drawing Sheets

100

100

200

300

400

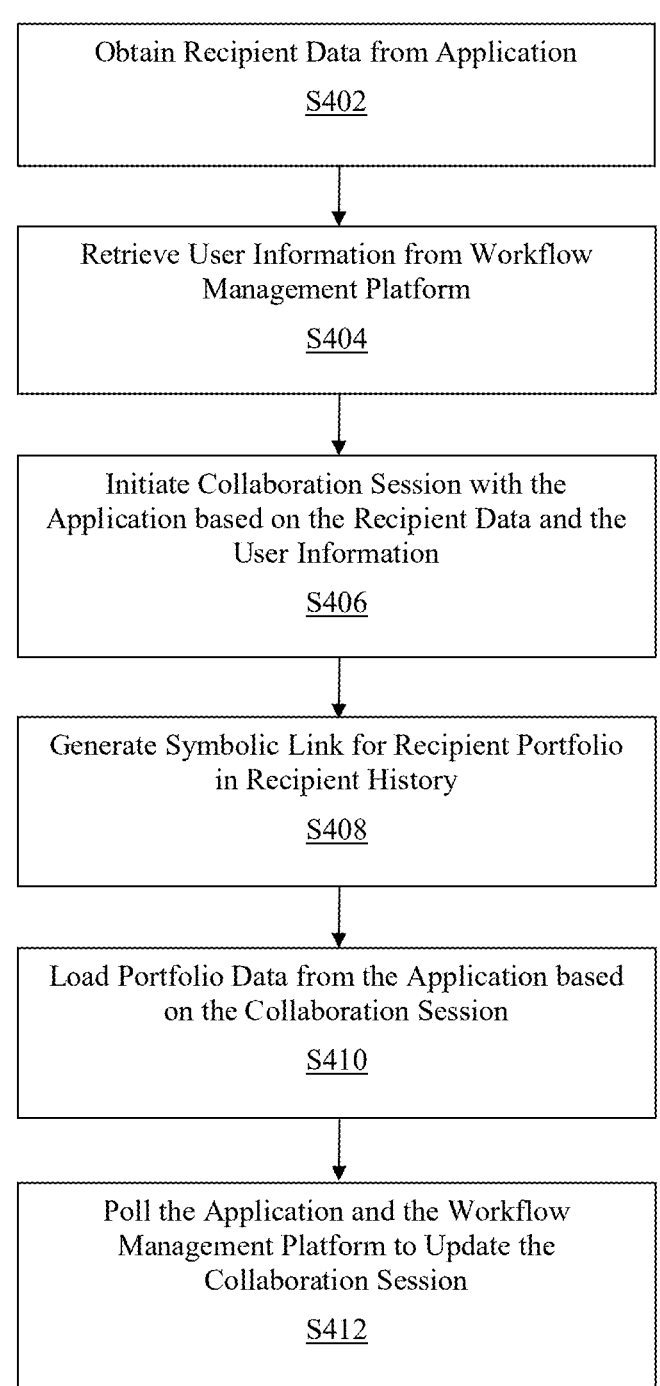

Obtain Recipient Data from Application

S402

Retrieve User Information from Workflow Management Platform

S404

Initiate Collaboration Session with the Application based on the Recipient Data and the User Information

S406

Generate Symbolic Link for Recipient Portfolio in Recipient History

S408

Load Portfolio Data from the Application based on the Collaboration Session

S410

Poll the Application and the Workflow Management Platform to Update the Collaboration Session

METHOD AND SYSTEM FOR FACILITATING CROSS PLATFORM COLLABORATION IN REAL-TIME

BACKGROUND

1. Field of the Disclosure

This technology generally relates to methods and systems for workflow management, and more particularly to methods and systems for providing workflow management to facilitate cross platform collaboration in real-time by enabling workflow coordination via customizable parameters.

2. Background Information

Many business entities provide services such as, for example, facilitating sales workflows for users via various associated applications and software platforms. Often, these services require close collaboration amongst the users to ensure optimal outcomes. Historically, implementations of conventional workflow management techniques have resulted in varying degrees of success with respect to effective and efficient cross platform collaboration.

One drawback of implementing conventional workflow management techniques is that in many instances, the users of these services must incorporate non-digitized workflow components such as, for example, multiple different communication channels and offline fine-tuning to facilitate cross platform collaboration. As a result, resources are inefficiently expended for non-digitized processes. Additionally, due to manual actions required by certain non-digitalized processes such as, for example, manual downloads and manual uploads necessary for offline fine-tuning, the conventional workflow management techniques may be prone to errors.

Therefore, there is a need for workflow management that facilitates cross platform collaboration in real-time by enabling workflow coordination via direct sharing and collaboration.

SUMMARY

The present disclosure, through one or more of its various aspects, embodiments, and/or specific features or sub-components, provides, inter alia, various systems, servers, devices, methods, media, programs, and platforms for providing workflow management to facilitate cross platform collaboration in real-time by enabling workflow coordination via customizable parameters.

According to an aspect of the present disclosure, a method for providing workflow management to facilitate cross platform collaboration is disclosed. The method is implemented by at least one processor. The method may include obtaining recipient data from at least one application, the recipient data may include availability data for a plurality of recipients; retrieving user information from at least one database of a workflow management platform; initiating at least one collaboration session with the at least one application based on the recipient data and the user information; generating, for each of the at least one collaboration session, at least one symbolic link to specify a data access path for at least one recipient portfolio in corresponding recipient history data; transferring portfolio data from the at least one application based on the initiated at least one collaboration session; and polling the at least one application and the workflow management platform to update the at least one collaboration session.

In accordance with an exemplary embodiment, each of the at least one collaboration session may include a plurality of participants from the workflow management platform and the at least one application, each of the plurality of participants may provide input in real-time for a workflow process.

In accordance with an exemplary embodiment, the workflow process may include an output step that determines an outcome in real-time based on the real-time input from each of the plurality of participants.

In accordance with an exemplary embodiment, the workflow process may include a refresh step that updates each iteration of at least one workflow in real-time based on the real-time input from each of the plurality of participants.

In accordance with an exemplary embodiment, the workflow process may include a universe step that enables selection of at least one operative universe in real-time based on the real-time input from each of the plurality of participants, each of the at least one operative universe may include a plurality of defined parameters for at least one workflow task.

In accordance with an exemplary embodiment, the method may further include receiving at least one distribution request from at least one user of the workflow management platform, each of the at least one distribution request may include recipient information for at least one recipient; and capturing information that corresponds to each of the at least one distribution request, wherein each of the at least one distribution request may relate to distribution instructions for providing the information to the at least one recipient via the at least one application; and wherein the information may include an analysis that is associated with the at least one user, a snapshot report of a product, and corresponding product analytics.

In accordance with an exemplary embodiment, the method may further include generating an invitation for the at least one recipient, the invitation may include access instructions for the captured information; transferring the invitation to a communication management component of the workflow management platform; and transmitting the invitation from the communication management component via at least one communication channel, the at least one communication channel may include electronic mail.

In accordance with an exemplary embodiment, the access instructions may include a pre-authenticated communication system that enables direct communication between a plurality of users, the plurality of recipients, and a plurality of data storage repositories via a communication protocol without additional authentication at each access instance.

In accordance with an exemplary embodiment, the method may further include generating a log for the at least one collaboration session, the log may include a record of participant activities within the at least one collaboration session; and publishing the log to each of a plurality of participants in the at least one collaboration session, wherein the log may be viewable via a graphical user interface for each of the plurality of participants.

According to an aspect of the present disclosure, a computing device configured to implement an execution of a method for providing workflow management to facilitate cross platform collaboration is disclosed. The computing device including a processor; a memory; and a communication interface coupled to each of the processor and the memory, wherein the processor may be configured to obtain recipient data from at least one application, the recipient data may include availability data for a plurality of recipients; retrieve user information from at least one database of a workflow management platform; initiate at least one collaboration session with the at least one application based on the recipient data and the user information; generate, for each of the at least one collaboration session, at least one symbolic link to specify a data access path for at least one recipient portfolio in corresponding recipient history data; transfer portfolio data from the at least one application based on the initiated at least one collaboration session; and poll the at least one application and the workflow management platform to update the at least one collaboration session.

In accordance with an exemplary embodiment, each of the at least one collaboration session may include a plurality of participants from the workflow management platform and the at least one application, each of the plurality of participants may provide input in real-time for a workflow process.

In accordance with an exemplary embodiment, the workflow process may include an output step that determines an outcome in real-time based on the real-time input from each of the plurality of participants.

In accordance with an exemplary embodiment, the workflow process may include a refresh step that updates each iteration of at least one workflow in real-time based on the real-time input from each of the plurality of participants.

In accordance with an exemplary embodiment, the workflow process may include a universe step that enables selection of at least one operative universe in real-time based on the real-time input from each of the plurality of participants, each of the at least one operative universe may include a plurality of defined parameters for at least one workflow task.

In accordance with an exemplary embodiment, the processor may be further configured to receive at least one distribution request from at least one user of the workflow management platform, each of the at least one distribution request may include recipient information for at least one recipient; and capture information that corresponds to each of the at least one distribution request, wherein each of the at least one distribution request may relate to distribution instructions for providing the information to the at least one recipient via the at least one application; and wherein the information may include an analysis that is associated with the at least one user, a snapshot report of a product, and corresponding product analytics.

In accordance with an exemplary embodiment, the processor may be further configured to generate an invitation for the at least one recipient, the invitation may include access instructions for the captured information; transfer the invitation to a communication management component of the workflow management platform; and transmit the invitation from the communication management component via at least one communication channel, the at least one communication channel may include electronic mail.

In accordance with an exemplary embodiment, the access instructions may include a pre-authenticated communication system that enables direct communication between a plurality of users, the plurality of recipients, and a plurality of data storage repositories via a communication protocol without additional authentication at each access instance.

In accordance with an exemplary embodiment, the processor may be further configured to generate a log for the at least one collaboration session, the log may include a record of participant activities within the at least one collaboration session; and publish the log to each of a plurality of participants in the at least one collaboration session, wherein the log may be viewable via a graphical user interface for each of the plurality of participants.

According to an aspect of the present disclosure, a non-transitory computer readable storage medium storing instructions for providing workflow management to facilitate cross platform collaboration is disclosed. The storage medium including executable code which, when executed by a processor, may cause the processor to obtain recipient data from at least one application, the recipient data may include availability data for a plurality of recipients; retrieve user information from at least one database of a workflow management platform; initiate at least one collaboration session with the at least one application based on the recipient data and the user information; generate, for each of the at least one collaboration session, at least one symbolic link to specify a data access path for at least one recipient portfolio in corresponding recipient history data; transfer portfolio data from the at least one application based on the initiated at least one collaboration session; and poll the at least one application and the workflow management platform to update the at least one collaboration session.

In accordance with an exemplary embodiment, each of the at least one collaboration session may include a plurality of participants from the workflow management platform and the at least one application, each of the plurality of participants may provide input in real-time for a workflow process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for providing workflow management to facilitate cross platform collaboration in real-time by enabling workflow coordination via customizable parameters.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
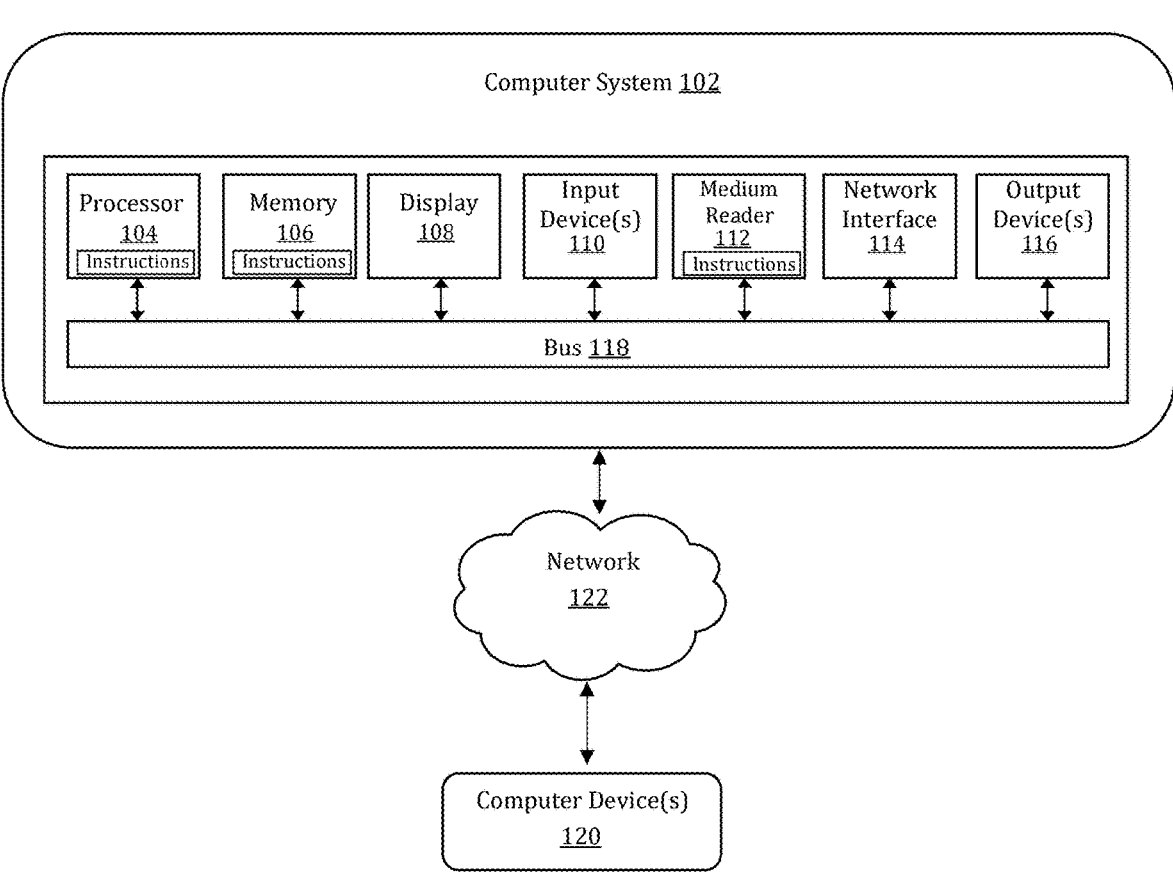
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing workflow management to facilitate cross platform collaboration in real-time by enabling workflow coordination via customizable parameters.

Figure 2:
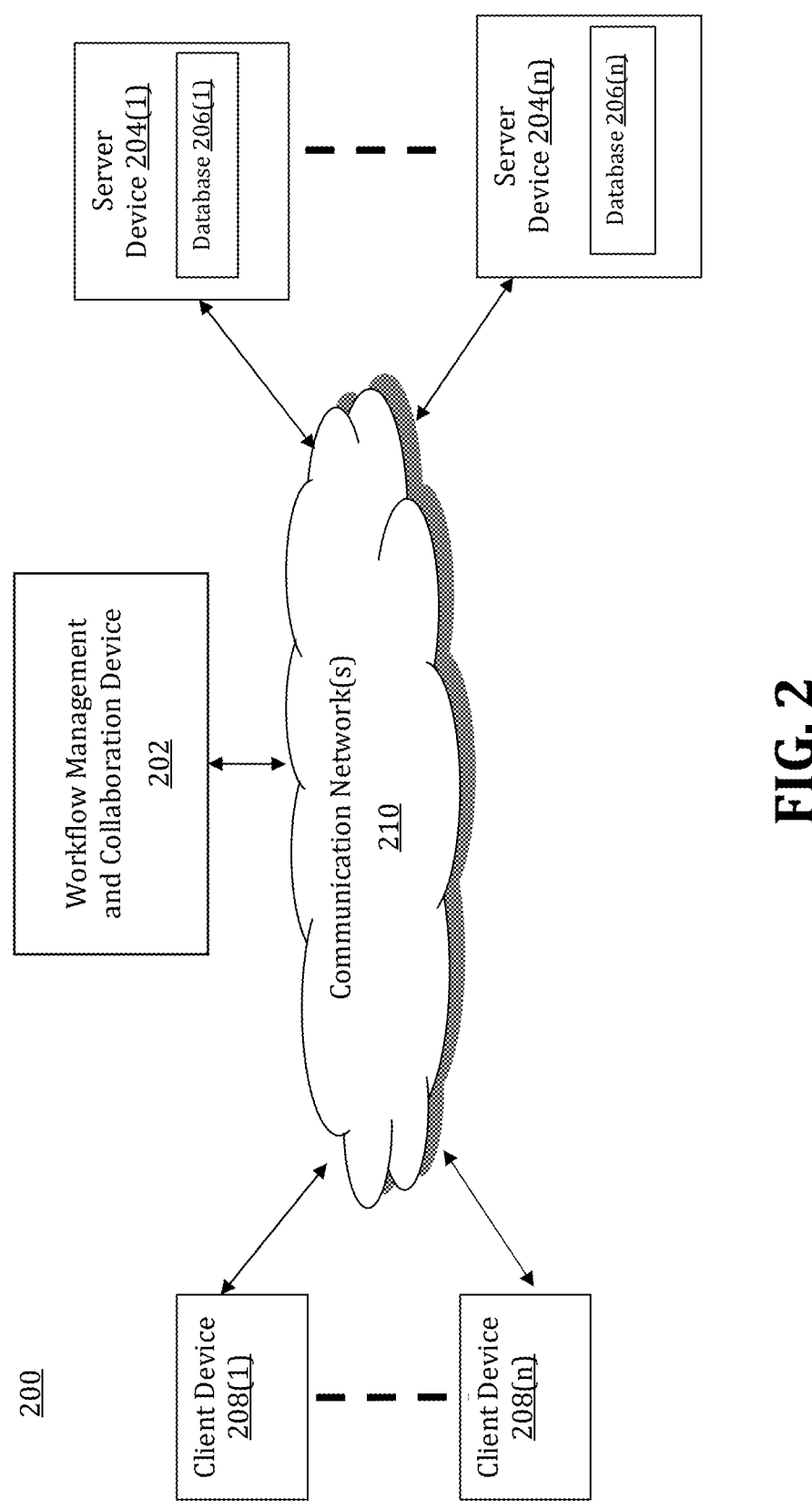
FIG. 2 illustrates an exemplary diagram of a network environment.

Referring to FIG. 2, a schematic of an exemplary network environment 200 for implementing a method for providing workflow management to facilitate cross platform collaboration in real-time by enabling workflow coordination via customizable parameters is illustrated. In an exemplary embodiment, the method is executable on any networked computer platform, such as, for example, a personal computer (PC).

The method for providing workflow management to facilitate cross platform collaboration in real-time by enabling workflow coordination via customizable parameters may be implemented by a Workflow Management and Collaboration (WMC) device 202. The WMC device 202 may be the same or similar to the computer system 102 as described with respect to FIG. 1. The WMC device 202 may store one or more applications that can include executable instructions that, when executed by the WMC device 202, cause the WMC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the WMC device 202 itself, may be located in virtual server(s) running in a cloud-based computing environment rather than being tied to one or more specific physical network computing devices. Also, the application(s) may be running in one or more virtual machines (VMs) executing on the WMC device 202. Additionally, in one or more embodiments of this technology, virtual machine(s) running on the WMC device 202 may be managed or supervised by a hypervisor.

In the network environment 200 of FIG. 2, the WMC device 202 is coupled to a plurality of server devices 204(1)-204(n) that hosts a plurality of databases 206(1)-206(n), and also to a plurality of client devices 208(1)-208(n) via communication network(s) 210. A communication interface of the WMC device 202, such as the network interface 114 of the computer system 102 of FIG. 1, operatively couples and communicates between the WMC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WMC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and WMC devices that efficiently implement a method for providing workflow management to facilitate cross platform collaboration in real-time by enabling workflow coordination via customizable parameters.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WMC device 202 may be a standalone device or integrated with one or more other devices or apparatuses, such as one or more of the server devices 204(1)-204(n), for example. In one particular example, the WMC device 202 may include or be hosted by one of the server devices 204(1)-204(n), and other arrangements are also possible. Moreover, one or more of the devices of the WMC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the WMC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to workflows, recipients, applications, management platforms, availability, platform users, collaboration sessions, symbolic links, and portfolios.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the WMC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the WMC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the WMC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WMC device 202, the server devices 204(1)-204(n), or the client devices 208(1)-208(n), for example, may be configured to operate as virtual instances on the same physical machine. In other words, one or more of the WMC device 202, the server devices 204 (1)-204(n), or the client devices 208(1)-208(n) may operate on the same physical device rather than as separate devices communicating through communication network(s) 210. Additionally, there may be more or fewer WMC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
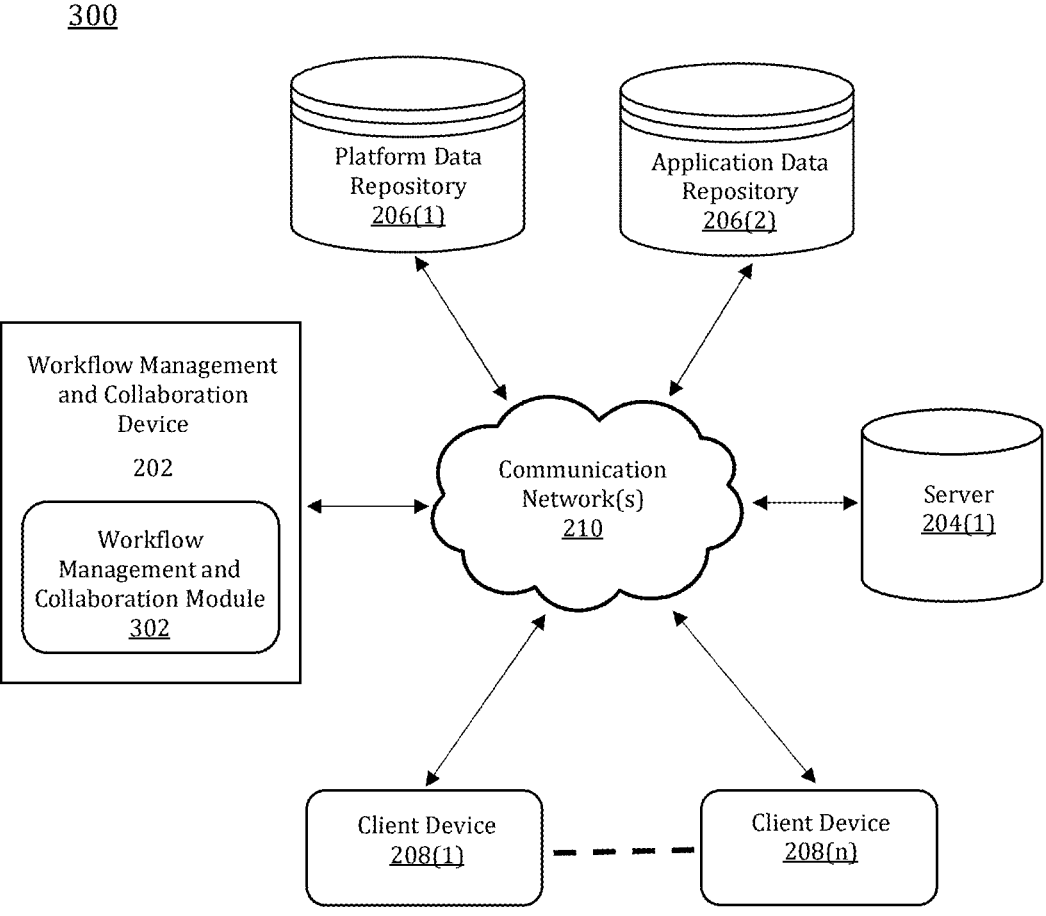
FIG. 3 shows an exemplary system for implementing a method for providing workflow management to facilitate cross platform collaboration in real-time by enabling workflow coordination via customizable parameters.

The WMC device 202 is described and shown in FIG. 3 as including a workflow management and collaboration module 302, although it may include other rules, policies, modules, databases, or applications, for example. As will be described below, the workflow management and collaboration module 302 is configured to implement a method for providing workflow management to facilitate cross platform collaboration in real-time by enabling workflow coordination via customizable parameters.

An exemplary process 300 for implementing a mechanism for providing workflow management to facilitate cross platform collaboration in real-time by enabling workflow coordination via customizable parameters by utilizing the network environment of FIG. 2 is shown as being executed in FIG. 3. Specifically, a first client device 208(1) and a second client device 208(2) are illustrated as being in communication with WMC device 202. In this regard, the first client device 208(1) and the second client device 208(2) may be "clients" of the WMC device 202 and are described herein as such. Nevertheless, it is to be known and understood that the first client device 208(1) and/or the second client device 208(2) need not necessarily be "clients" of the WMC device 202, or any entity described in association therewith herein. Any additional or alternative relationship may exist between either or both of the first client device 208(1) and the second client device 208(2) and the WMC device 202, or no relationship may exist.

Further, WMC device 202 is illustrated as being able to access a platform data repository 206(1) and an application data repository 206(2). The workflow management and collaboration module 302 may be configured to access these databases for implementing a method for providing workflow management to facilitate cross platform collaboration in real-time by enabling workflow coordination via customizable parameters.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the WMC device 202 via broadband or cellular communication. Of course, these embodiments are merely exemplary and are not limiting or exhaustive.

Upon being started, the workflow management and collaboration module 302 executes a process for providing workflow management to facilitate cross platform collaboration in real-time by enabling workflow coordination via customizable parameters. An exemplary process for providing workflow management to facilitate cross platform collaboration in real-time by enabling workflow coordination via customizable parameters is generally indicated at flowchart 400 in FIG. 4.

In the process 400 of FIG. 4, at step S402, recipient data may be obtained from various applications. In an exemplary embodiment, the recipient data may relate to information that corresponds to end users of the applications. The recipient data may correspond to a collection of discrete or continuous values that convey information. The recipient data may include availability data for a plurality of recipients. For example, the recipient data may include a collection of alphanumeric characters and/or symbols that a computing system may process to determine current availability for potential recipients of a portfolio solutions workflow. Consistent with present disclosures, the end users of the applications may be referenced as recipients and/or potential recipients based on an ability of the end users to receive information from users of workflow management platforms via the disclosed system.

In another exemplary embodiment, the recipient data may be retrieved from the applications via a collaboration service that is associated with the disclosed system. The collaboration service may interact with an initiator component for each of the applications to facilitate the exchange of recipient data. The interaction may be facilitated by using a communication channel and corresponding data exchange protocols such as, for example, an application programming interface. The communication channel and corresponding data exchange protocols may enable the exchange of data from the applications to the collaboration service and vice versa, from the collaboration service to the applications. The communication channel and corresponding data exchange protocols may enable the transmission of data from components within a networked environment as well as from external networked environments.

In another exemplary embodiment, the applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, user information may be retrieved from a database of a workflow management platform. In an exemplary embodiment, the user information may relate to data that correspond to end users of a workflow management platform. The user information may correspond to a collection of discrete or continuous values that convey particulars for users of the platform such as, for example, entitlement information and authorization information. The user information may include profile data for a plurality of platform users. For example, the user information may include a collection of alphanumeric characters and/or symbols that a computing system may process to determine parameters for originators of a portfolio solutions workflow. Consistent with present disclosures, the end users of the workflow management platform may be referenced as users based on an ability of the end users to implement portfolio solutions workflows via the disclosed system.

In another exemplary embodiment, the user information may be retrieved from the database via a collaboration service that is associated with the disclosed system. The collaboration service may interact with the database to facilitate the exchange of user information. The interaction may be facilitated by using a communication channel and corresponding data exchange protocols such as, for example, an application programming interface. The communication channel and corresponding data exchange protocols may enable the exchange of data from the database to the collaboration service and vice versa, from the collaboration service to the database. The communication channel and corresponding data exchange protocols may enable the transmission of data from components within a networked environment as well as from external networked environments.

In another exemplary embodiment, the workflow management platform may include any hardware devices and/or software components that are used to host a service such as, for example, a portfolio solutions workflow. The workflow management platform may enable the execution of applications, programs, and/or processes related to the portfolio solutions workflow. The workflow management platform may include data persistence components such as, for example, the database. Consistent with present disclosures, the workflow management platform may refer to both the underlying hardware devices and/or software components that enable a workflow management layer as well as the workflow management layer itself.

In another exemplary embodiment, the database may correspond to a data repository that is associated with the workflow management platform. The database may relate to an organized collection of structured information that is electronically stored in a computing system. The database may be controlled by a database management system such as, for example, a distributed non-structured query language (NoSQL) database management system that manages large amounts of data across many commodity servers.

At step S406, collaboration sessions may be initiated with the applications based on the recipient data and the user information. In an exemplary embodiment, the collaboration sessions may relate to a permanent and/or semi-permanent interactive information interchange between two or more communicating devices as well as between a computing device and a user. The collaboration sessions may correspond to a time-delimited two-way link that enables interactive expression and information exchange. For example, an initiated collaboration session may include multiple invitees who individually contributes to analysis and outputs simultaneously. The collaboration sessions may include real-time updating of various information, real-time implementation of selected operational environments, and real-time processing of input parameters to provide full visibility into and/or control of real-time changes such as, for example, the addition of new participants to the collaboration session.

In another exemplary embodiment, each of the collaboration sessions may include a plurality of participants from the workflow management platform and the applications. Each of the plurality of participants may provide input in real-time for a workflow process such as, for example, for a portfolio solutions workflow process. The collaboration session may enable a centralized iterative workflow and two-way communication that together provide enhanced collaboration among multiple participants—both internal participants and external participants. The collaboration sessions may streamline interactions by allowing pre-authenticated sharing of data among the multiple participants to reduce friction. Additionally, the interactions may be further streamlined by reducing required documentations such as, for example, non-disclosure agreements among the participants and by improving privacy of shared data via targeted sharing of specific data.

In another exemplary embodiment, the workflow process may include an output step that determines an outcome in real-time based on the real-time input from each of the plurality of participants. The output may include projections of a future state as determined by analytical processes based on the real-time inputs. In another exemplary embodiment, the workflow process may include a refresh step that updates each iteration of the workflows in real-time based on the real-time input from each of the participants. For example, the collaboration sessions may involve real-time updates of hedge iterations.

In another exemplary embodiment, the workflow process may include a universe selection step that enables selection of operative universes in real-time based on the real-time input from each of the plurality of participants. Each of the operative universes may include defined parameters for workflow tasks. That is, workflow tasks within the operative universe must follow the defined parameters of the operative universe. In another exemplary embodiment, the collaboration sessions may be automatically initiated according to predetermined guidelines and predetermined user preferences. The predetermined guidelines may include business related guidelines, technology related guidelines, as well as regulatory guidelines. The predetermined user preferences may include data sharing preferences such as, for example, a type of data for sharing and a sharing duration. Alternatively, the collaboration sessions may be manually initiated according to user inputs. The manually initiated collaboration sessions may also be governed by guidelines and preferences inputted by the user.

In another exemplary embodiment, users may generate copies of corresponding analysis for sending to selected recipients. The generated copies may relate to a snapshot report of a product such as, for example, a financial instrument as well as a snapshot of a grouping of products such as, for example, a portfolio of financial instruments.

To facilitate the sending of the generated copies, distribution requests may be received from the users of the workflow management platform. Each of the distribution requests may relate to distribution instructions for providing the information to the recipients via the applications. The distribution instructions may provide controls for the consumption of data sets by dictating the type of information to provide. For example, the disclosed system may allow users to maintain full discretion over investment positions by providing distribution instructions to not disclose portfolio compositions but only share aggregate-level analytics.

Additionally, the distribution requests may include recipient information for the recipients. That is, the distribution requests may indicate a specific recipient for each of a plurality of data sets. Then, information that corresponds to each of the distribution requests may be captured in real-time from various connected sources to facilitate the requested actions. The information may include an analysis that is associated with the users, a snapshot report of a product, and corresponding product analytics.

Furthermore, invitations may be generated for the recipients. The invitations may include access instructions for the captured information. The access instructions may include a pre-authenticated communication system that enables direct communication between the users, the recipients, and a plurality of data storage repositories via a communication protocol without additional authentication at each access instance. For example, the access instructions may include a customizable hyperlink such as a pre-authenticated Uniform Resource Locator (URL) that enables direct access to the snapshot report persisted in a data repository. Then, the invitation may be transferred to a communication management component of the workflow management platform. The invitations may be transmitted from the communication management component to the selected recipients via a variety of communication channels. The communication channel may include an electronic mail communication channel.

At step S408, symbolic links may be generated to specify a data access path for recipient portfolios in corresponding recipient history data. The symbolic links may be generated for each of the collaboration sessions. In an exemplary embodiment, the symbolic link may contain a text string that is automatically interpreted and followed by an operating system as a path to another file and/or directory. The symbolic link may include a file whose purpose is to point to another file and/or directory by specifying a communication path. The symbolic links may be generated for portfolio data in recipient history data. The recipient history data may be persisted in a data repository that is associated with the workflow management platform.

At step S410, portfolio data may be transferred from the applications based on the initiated collaboration sessions. In an exemplary embodiment, a receiver component of the applications may be usable to load portfolio data for the collaboration service. The portfolio data may be usable to provide additional participant related data in real-time for the collaboration sessions. The portfolio data may include information relating to individual components of a portfolio as well as the portfolio itself. For example, when the portfolio relates to a range of investments held, the portfolio data may include information relating to each of the investments as well as information relating to the holder of the investments.

At step S412, the applications and the workflow management platform may be polled to update the collaboration sessions. In an exemplary embodiment, an initiator component of the application platform may initiate joint update polling with the collaboration service. Polling may correspond to a process where a computing component and/or a controlling device waits for an external device to check for a readiness state. A polled operation of the computing component and/or controlling device may repeatedly sample the status of the external device via a client program. The application platform may update information jointly with the collaboration service based on the readiness state.

In another exemplary embodiment, a full audit trail for the collaboration sessions may be maintained in a historical data set that corresponds to each of the participants. Information related to the audit trail may include types of products selected during the collaboration sessions and a corresponding timestamp for each of the selections. To facilitate maintenance of the full audit trail, logs may be generated for the collaboration sessions. The logs may include a record of participant activities and inputs within the collaboration sessions. Then, consistent with present disclosures, the logs may be published to each of the participants in the collaboration sessions. The logs may be viewable via a graphical user interface for each of the participants. For example, the logs may be viewable via a historical view tab of a participant dashboard.

In another exemplary embodiment, analytical processes referenced in the present disclosure may be facilitated by using models to manage and process large data sets such as, for example, data sets associated with a financial product. The models may relate to at least one from among a large language model, a deep learning model, a natural language processing model, a machine learning model, a mathematical model, a process model, and a data model. The models may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori Algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

Figure 5:
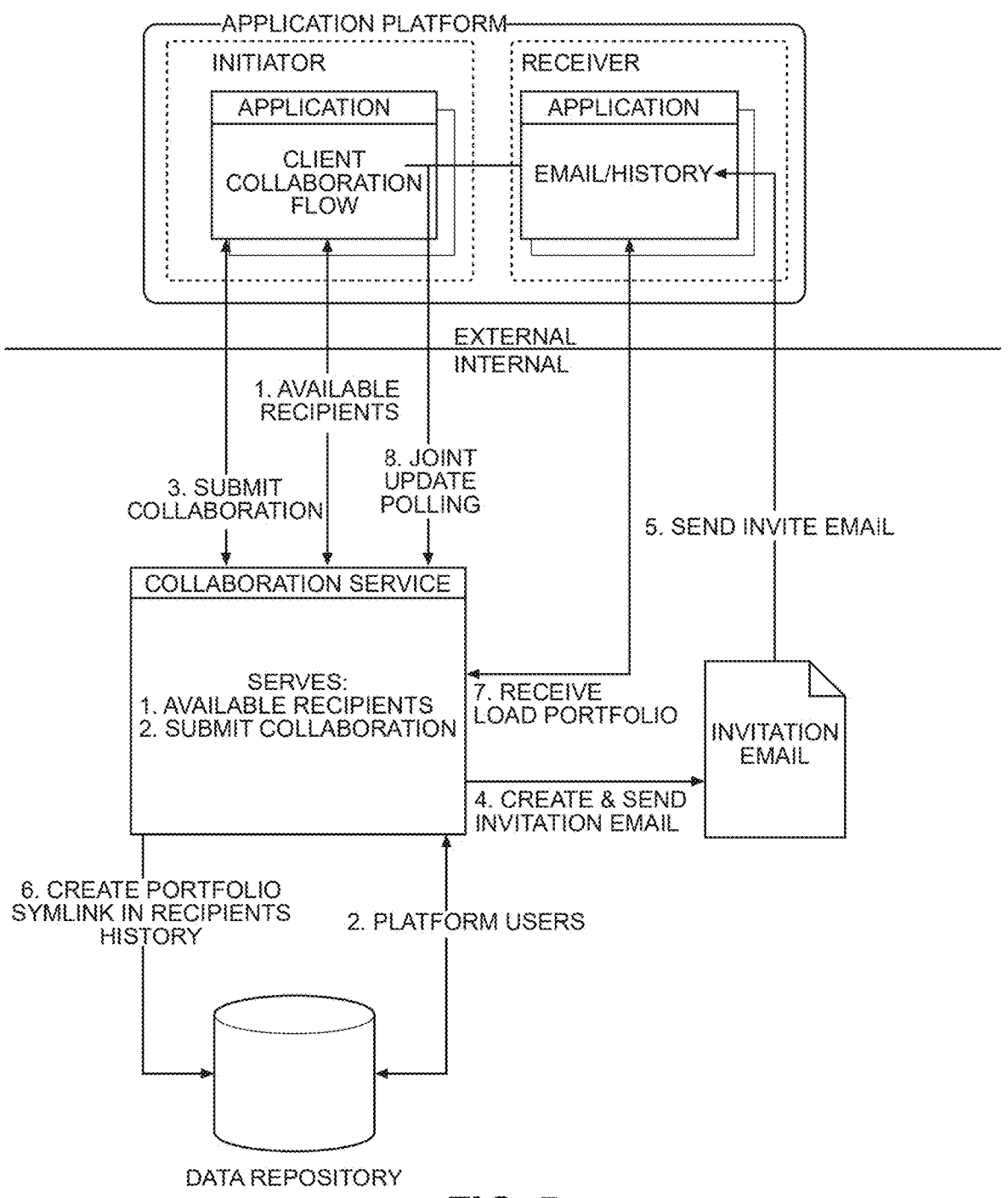
FIG. 5 is an architectural diagram of an exemplary process for implementing a method for providing workflow management to facilitate cross platform collaboration in real-time by enabling workflow coordination via customizable parameters.

FIG. 5 is an architectural diagram 500 of an exemplary process for implementing a method for providing workflow management to facilitate cross platform collaboration in real-time by enabling workflow coordination via customizable parameters. In FIG. 5, an exemplary architecture is provided to facilitate a centralized iterative workflow and two-way communication, which together, enables enhanced collaboration among multiple internal and external participants for real-time data analytics.

As illustrated in FIG. 5, a collaboration architecture for a portfolio solutions workflow may include a collaboration service component that facilitates interactions between applications and workflow management platforms. The collaboration service component may enable communication between external systems such as, for example, the applications and internal systems such as, for example, the workflow management platforms.

To facilitate the interactions and provide services consistent with present disclosures, at step 1, the collaboration service may interact with an initiator component of an application platform to retrieve available recipient information. The initiator component may be usable to manage client collaboration workflow for the application. At step 2, the collaboration service may retrieve platform user information from a data repository that is associated with the workflow management platforms. At step 3, the collaboration service may submit a collaboration request to the application based on the retrieved available recipient information and the retrieved platform user information.

At step 4, the collaboration service may generate invitation emails for participants of the collaboration session and send the invitation emails to a communication management component. The communication management component may be usable to facilitate interactions via a communication channel such as, for example, an email communication channel. At step 5, the communication management component may interact with a receiver component of the application to provide the invitation emails to users of the application. At step 6, portfolio symbolic links may be generated by the collaboration service for the participants. The portfolio symbolic links may be generated in corresponding recipient history data sets in the data repository.

At step 7, the receiver component of the application platform may load portfolio data for the collaboration service. The portfolio data may be usable to provide additional participant related data in real-time for the collaboration sessions. Then, at step 8, the initiator component of the application platform may initiate joint update polling with the collaboration service. The application platform may update information jointly with the collaboration service based on a readiness state.

Accordingly, with this technology, an optimized process for providing workflow management to facilitate cross platform collaboration in real-time by enabling workflow coordination via customizable parameters is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing workflow management to facilitate cross platform collaboration, the method being implemented by at least one processor, the method comprising:

obtaining, by the at least one processor, recipient data from at least one application, the recipient data including availability data for a plurality of recipients;

retrieving, by the at least one processor, user information from at least one database of a workflow management platform;

initiating, by the at least one processor, at least one collaboration session with the at least one application based on the recipient data and the user information;

generating, by the at least one processor for each of the at least one collaboration session, at least one symbolic link to specify a data access path for at least one recipient portfolio in corresponding recipient history data;

transferring, by the at least one processor, portfolio data from the at least one application based on the initiated at least one collaboration session;

polling, by the at least one processor, the at least one application and the workflow management platform to update the at least one collaboration session;

receiving, by the at least one processor, at least one distribution request from at least one user of the workflow management platform, each of the at least one distribution request including recipient information for at least one recipient; and capturing, by the at least one processor, information that corresponds to each of the at least one distribution request, wherein each of the at least one distribution request relates to distribution instructions for providing the information to the at least one recipient via the at least one application; and wherein the information includes an analysis that is associated with the at least one user, a snapshot report of a product, and corresponding product analytics.

2. The method of claim 1, wherein each of the at least one collaboration session includes a plurality of participants from the workflow management platform and the at least one application, each of the plurality of participants providing input in real-time for a workflow process.

3. The method of claim 2, wherein the workflow process includes an output step that determines an outcome in real-time based on the real-time input from each of the plurality of participants.

4. The method of claim 2, wherein the workflow process includes a refresh step that updates each iteration of at least one workflow in real-time based on the real-time input from each of the plurality of participants.

5. The method of claim 2, wherein the workflow process includes a universe step that enables selection of at least one operative universe in real-time based on the real-time input from each of the plurality of participants, each of the at least one operative universe including a plurality of defined parameters for at least one workflow task.

6. The method of claim 1, further comprising:

generating, by the at least one processor, an invitation for the at least one recipient, the invitation including access instructions for the captured information;

transferring, by the at least one processor, the invitation to a communication management component of the workflow management platform; and transmitting, by the at least one processor, the invitation from the communication management component via at least one communication channel, the at least one communication channel including electronic mail.

7. The method of claim 6, wherein the access instructions include a pre-authenticated communication system that enables direct communication between a plurality of users, the plurality of recipients, and a plurality of data storage repositories via a communication protocol without additional authentication at each access instance.

8. The method of claim 1, further comprising:

generating, by the at least one processor, a log for the at least one collaboration session, the log including a record of participant activities within the at least one collaboration session; and publishing, by the at least one processor, the log to each of a plurality of participants in the at least one collaboration session, wherein the log is viewable via a graphical user interface for each of the plurality of participants.

9. A computing device configured to implement an execution of a method for providing workflow management to facilitate cross platform collaboration, the computing device comprising:

a processor;

a memory; and a communication interface coupled to each of the processor and the memory, wherein the processor is configured to:

obtain recipient data from at least one application, the recipient data including availability data for a plurality of recipients;

retrieve user information from at least one database of a workflow management platform;

initiate at least one collaboration session with the at least one application based on the recipient data and the user information;

generate, for each of the at least one collaboration session, at least one symbolic link to specify a data access path for at least one recipient portfolio in corresponding recipient history data;

transfer portfolio data from the at least one application based on the initiated at least one collaboration session;

poll the at least one application and the workflow management platform to update the at least one collaboration session;

receive at least one distribution request from at least one user of the workflow management platform, each of the at least one distribution request including recipient information for at least one recipient; and capture information that corresponds to each of the at least one distribution request, wherein each of the at least one distribution request relates to distribution instructions for providing the information to the at least one recipient via the at least one application; and wherein the information includes an analysis that is associated with the at least one user, a snapshot report of a product, and corresponding product analytics.

10. The computing device of claim 9, wherein each of the at least one collaboration session includes a plurality of participants from the workflow management platform and the at least one application, each of the plurality of participants providing input in real-time for a workflow process.

11. The computing device of claim 10, wherein the workflow process includes an output step that determines an outcome in real-time based on the real-time input from each of the plurality of participants.

12. The computing device of claim 10, wherein the workflow process includes a refresh step that updates each iteration of at least one workflow in real-time based on the real-time input from each of the plurality of participants.

13. The computing device of claim 10, wherein the workflow process includes a universe step that enables selection of at least one operative universe in real-time based on the real-time input from each of the plurality of participants, each of the at least one operative universe including a plurality of defined parameters for at least one workflow task.

14. The computing device of claim 9, wherein the processor is further configured to:

generate an invitation for the at least one recipient, the invitation including access instructions for the captured information;

transfer the invitation to a communication management component of the workflow management platform; and transmit the invitation from the communication management component via at least one communication channel, the at least one communication channel including electronic mail.

15. The computing device of claim 14, wherein the access instructions include a pre-authenticated communication system that enables direct communication between a plurality of users, the plurality of recipients, and a plurality of data storage repositories via a communication protocol without additional authentication at each access instance.

16. The computing device of claim 9, wherein the processor is further configured to:

generate a log for the at least one collaboration session, the log including a record of participant activities within the at least one collaboration session; and publish the log to each of a plurality of participants in the at least one collaboration session, wherein the log is viewable via a graphical user interface for each of the plurality of participants.

17. A non-transitory computer readable storage medium storing instructions for providing workflow management to facilitate cross platform collaboration, the storage medium comprising executable code which, when executed by a processor, causes the processor to:

obtain recipient data from at least one application, the recipient data including availability data for a plurality of recipients;

retrieve user information from at least one database of a workflow management platform;

initiate at least one collaboration session with the at least one application based on the recipient data and the user information;

generate, for each of the at least one collaboration session, at least one symbolic link to specify a data access path for at least one recipient portfolio in corresponding recipient history data;

transfer portfolio data from the at least one application based on the initiated at least one collaboration session;

poll the at least one application and the workflow management platform to update the at least one collaboration session;

receive at least one distribution request from at least one user of the workflow management platform, each of the at least one distribution request including recipient information for at least one recipient; and capture information that corresponds to each of the at least one distribution request, wherein each of the at least one distribution request relates to distribution instructions for providing the information to the at least one recipient via the at least one application; and wherein the information includes an analysis that is associated with the at least one user, a snapshot report of a product, and corresponding product analytics.

18. The storage medium of claim 17, wherein each of the at least one collaboration session includes a plurality of participants from the workflow management platform and the at least one application, each of the plurality of participants providing input in real-time for a workflow process.

\* \* \* \* \*